Figure 1:
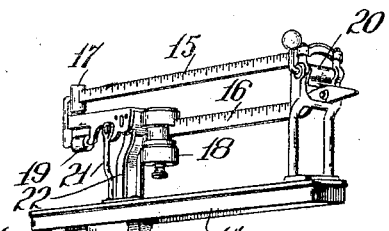
Figure 1:
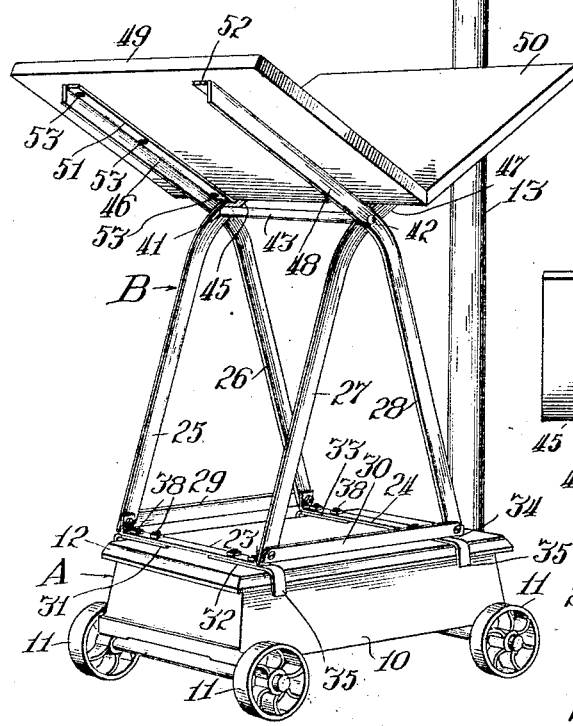

Dec. 1, 1925.

E. PEARSON

WEIGHING STAND

Filed June 30, 1925

1,563,521

Inventor
Edward Pearson
By Thomas H. Ferguson
Attorney

Patented Dec. 1, 1925.

1,563,521

UNITED STATES PATENT OFFICE.

EDWARD PEARSON, OF DALBO, MINNESOTA.

WEIGHING STAND.

Application filed June 30, 1925. Serial No. 40,553.

*To all whom it may concern:*

Be it known that I, EDWARD PEARSON, a citizen of the United States, residing at Dalbo, county of Isanti, and State of Minnesota, have invented certain new and useful Improvements in Weighing Stands, of which the following is a specification.

The present invention relates to weighing stands for use upon platform scales, and the principal object of the invention is to devise a stand of this class for use in weighing butter and like commodities.

It has been the custom heretofore for the creamery operator to weigh the butter without the use of such a stand. It has been his practice to place an empty wooden butter tub on the scale platform and then adjust the scale to a neutral balance, then remove the butter from the churn and pack it in the tub until the scale reaches the required net weight. This practice does not give satisfactory results because the operator will not always adjust the scale for each empty tub. If he does not do this, he cannot be sure that he has the same weight of butter in each tub, for the tubs vary considerably in weight. One tub may be made of heavier wood than another, one may be more porous than another and have taken into its pores more of the commodity which it previously held, or more moisture. The period of service may have changed its weight. Climatic conditions may have caused one to weigh more than another. But, whatever the cause, the prior practice is quite unsatisfactory. At times the creameries have been subject to heavy penalties by the Government because of short weight resulting from this defective prior practice.

The present invention has been devised with a view to overcoming the defects of this prior art practice. To this end I have provided a stand which may be placed upon the platform of a platform weighing scale, after first having adjusted the stand to fit the size of the platform, and then the scale is adjusted to balance the weight of the stand and the open ended scoop or trough upon it. Once this is done, it need not be repeated for the weight of the stand and scoop is constant. The butter is then taken from the churn and placed in the wooden trough or scoop on the top of the stand until the scale reaches the exact weight wanted. Then the trough is removed from the stand, and the butter removed from the trough into the tub wherein it is packed and the tub, when sealed, is ready for shipment. By using my device the amount of butter is the same in all the tubs and a short weight shipment is impossible.

Having pointed out the general nature and object of my invention, attention is now directed to the following detailed description and the accompanying drawing wherein the invention is more fully disclosed. The exact scope of the invention is particularly pointed out in the appended claims.

Figure 2:
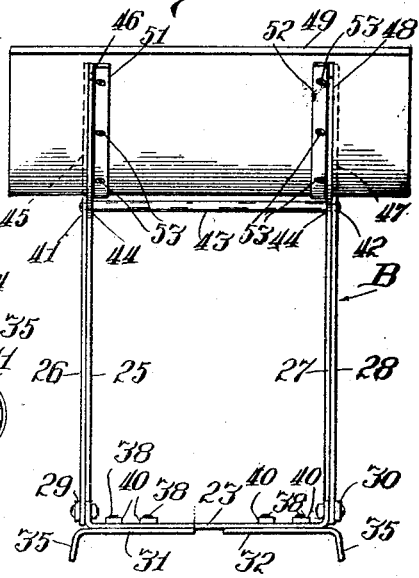
Figure 3:
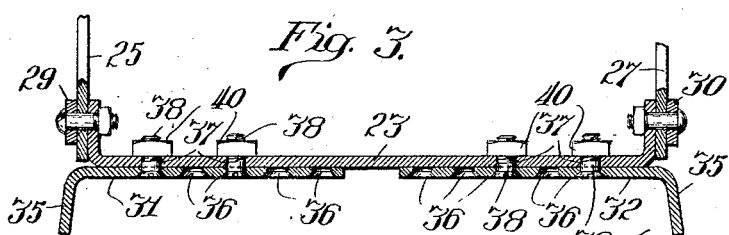

In the drawing, Fig. 1 is a perspective view of a scale and weighing stand, the latter being constructed in accordance with the present invention; Fig. 2 is a side elevation of the stand which comprises a supporting frame and a trough or scoop for holding the commodity; and Fig. 3 is a vertical section through a transverse member at the lower portion of the frame, and adjustable shoes on the under side of the same. Throughout these views like characters refer to like parts.

Referring to the drawing in detail, A designates the weighing scale, and B the weighing stand positioned upon the platform of the scale. The weighing scale A may be of any preferred platform scale construction. In the present instance it comprises a base 10 mounted upon wheels 11 and carrying a weighing platform 12. The base 10 also supports a standard 13 which carries at its upper end a horizontal arm 14 above which the scale beams 15 and 16 are located. The weights 17 and 18 are movable along the beams 15 and 16, respectively. The heavier weight 18 is used for the larger units of weight designated by the markings of the beam 16, and the smaller weight 17 performs a like function for the units of lesser value upon the beam 15. An adjustable weight 19 is mounted on a threaded rod to initially balance the scale parts, as is usual in a scale of this construction. The beams are held against oscillation by a clamping device 20 which may be rocked into or out of locking position. The beams 15 and 16 are secured together and actuated by suitable mechanism extending down through the standard 13 to the levers and other mechanism in the base 10 upon which the platform 12 acts. Certain of these connections are shown in the links 21 and 22. No claim is made to the scale structure itself for the reason that the same is well known in the art and forms no part of the present invention, except that the framework of the stand is shaped so as to fit upon the platform 12 of the weighing scale.

The stand B includes transverse members 23 and 24 which are upturned at their ends and riveted to the lower ends of upright frame members 25, 26, 27, 28, and to longitudinal frame members 29, 30. The lower frame members 23, 24, 29, 30 form a rigid base frame for the uprights 25, 26, 27, 28. The transverse horizontal members 23, 24 also serve as supporting members for the shoes 31, 32, 33, 34, which bear directly upon the top of the platform 12 of the scale. These shoes have in each instance a downwardly projecting toe 35. These toes are provided for the purpose of limiting the lateral movement of the stand upon the platform 12. In practice the width of the scale platform varies considerably and it is, therefore, desirable to have the shoes adjustable upon the supporting members 23 and 24. For this purpose each shoe is provided with a number of holes 36 and the supporting members 23 and 24 are provided with a fewer number of similar holes 37. Screw bolts 38 are passed through the holes 36 and 37 to secure the shoe in place with the adjustment desired. The holes 36 are countersunk and the heads of the bolts 38 are flat and closely fit within the countersunk holes 36 so that their outer ends are flush with the under surface of the shoe. As a result the shoes bear evenly upon the platform 12. The bolts 38 are firmly held in place by nuts 40.

The uprights are arranged in pairs, 25 and 26 constituting one pair, and 27 and 28 the other. Preferably the members of each pair cross each other at an intermediate point, such as the point 41 in the case of one pair, and the point 42 in the case of the other pair. At these points of intersection the members of each pair are secured together by a rod 43 which is turned down at its ends to provide shoulders 44 against which the members 25 and 27 bear. The outer ends of the rod 43 are then preferably upset with rivet heads although, of course, other means may be employed for securing the rod 43 to the two pairs of uprights. The upper ends of the uprights 25, 26, 27, 28 terminate in upwardly diverging arms 45, 46, 47, 48 respectively. These arms come directly in contact with the trough or scoop which holds the butter. The latter is preferably composed of two plain boards 49 and 50 which are of the same length and fitted together along one edge at an angle of preferably something more than 90 degrees. Of course this angle may be varied according to the judgment of the designer. The under sides of the boards 48 and 49 are provided with strips 51 and 52 which are preferably of metal and serve to hold the boards 49 and 50 in proper angular relation. The strips 51 and 52 are secured to the boards 49 and 50 in any suitable way, preferably by short screws 53 which pass through openings in the strips but do not pass through the boards 49 and 50. It is to be noted that each of the strips 51 and 52 extends under both of the boards 49 and 50.

In operation, as before outlined, the complete stand B is placed upon the scale platform 12 and the proper weights of the scale adjusted to give a neutral balance. The particular weights employed for this purpose will depend in each instance upon the particular scale used. Ordinarily a tare weight will be used to establish this initial balance. Then, with the trough in place the butter is removed from the churn and placed in the trough. This placing of the butter is continued until the scale indicates the correct weight, which will be the weight of the butter which is to be deposited in the tub or other receptacle. In the case of other commodities, and even in the case of butter, other receptacles than tubs may be employed although, as before noted, I have had before me particularly the object of overcoming the prior defects in the weighing and packaging of butter in tubs. When the right amount of butter has been placed in the trough, then the same is removed from its supporting arms and the butter deposited in the tub, a paddle being used, if necessary to scrape off the boards 49 and 50 of the scoop or trough. The next tub is filled in the same way. Thus, the varying weights of the tubs themselve do not enter into the operations and short weights do not occur.

In case it is necessary to use the stand upon a different scale platform, and one which has a different width, then the shoes 31, 32, 33 and 34, are adjusted so that the toes 35 will easily slip down over the edges of the platform so as to leave the under side of the shoes bearing directly upon the latter, as clearly shown in the drawings. Obviously, the toes 35 upon the several shoes, serve to hold the stand in position upon the scale platform and prevent its being accidentally pushed off of the same during its ordinary use in a creamery. It may also be noted that although the scale platform is near the floor, yet the scoop upon the upper part of the stand is some distance from the floor and at a point where the operator can use it efficiently and with a minimun of effort on his part. Its elevated location also enables him to observe the scale indications more easily. When out of use the entire stand, both scoop and supporting frame, are readily removable from the weighing scale, and the latter is left free for other weighings. Besides serving to hold the members 49 and 50 in proper angular position, the strips 51 and 52 also serve to position the trough upon the supporting arms. In the embodiment shown, the strips 51 and 52 fit on the inside of the arms 46, 47, 48, and 49. Obviously they might be otherwise positioned, if desired. Furthermore, other guiding means might be employed. It is obvious, too, that the uprights might be differently arranged than in the embodiment shown. These and other modifications may be made without departing from the spirit and scope of my invention. I therefore aim to cover all such changes by the terms of the appended claims.

What I claim as new and desire to secure by a patent of the United States is:

1. A weighing stand for use upon the platform of a platform weighing scale, comprising lower frame members, shoes on the under side of certain of said members adapted to bear directly upon the scale platform, upright frame members secured at their lower ends to said lower frame members and terminating at their upper ends in pairs of upwardly diverging arms, and a scoop having an open end and plane sides meeting at an angle corresponding to that of said pairs of arms and adapted to fit and rest in said arms when in weighing position.

2. A weighing stand for use upon the platform of a platform weighing scale, comprising horizontal lower frame members, shoes upon certain of said members adapted to bear directly upon the scale platform, said shoes having downwardly projecting toes at their outer ends to limit the lateral movement of the stand upon the platform, upright frame members secured at their lower ends to said lower frame members and terminating at their upper ends in pairs of upwardly diverging arms, and a scoop having an open end and plane sides meeting at an angle corresponding to that of said pairs of arms and adapted to fit and rest in said arms when in weighing position.

3. A weighing stand for use upon the platform of a platform weighing scale, comprising lower transverse horizontal frame members, lower longitudinal frame members, adjustable shoes having down turned toes at their outer ends secured to the under sides of said transverse members, said toes serving to limit the lateral movement of said stand on the scale platform, two pairs of upright frame members secured at their lower ends to said lower transverse and longitudinal members and each pair terminating at its upper end in upwardly divergent arms, and a scoop having an open end and plane sides meeting at an angle corresponding to that of said pairs of arms and adapted to fit and rest in said arms when in weighing position.

4. A weighing stand for use upon the platform of a platform weighing scale, comprising lower transverse horizontal frame members, lower longitudinal frame members, adjustable shoes having down turned toes at their outer ends secured to the under side of said transverse members, said toes serving to limit the lateral movement of said stand on the scale platform, two pairs of upright frame members secured at their lower ends to said transverse and longitudinal members, and the members of each pair crossing each other toward their upper ends and terminating above said crossing point in upwardly divergent arms, a stay rod between said pairs of arms connected to them at their crossing points, and a scoop having an open end and plane sides meeting at an angle corresponding to that of said pairs of arms and adapted to fit and rest in said arms when in weighing position.

In witness whereof, I hereunto subscribe my name this 26 day of June, 1925.

EDWARD PEARSON.